UNITED STATES PATENT OFFICE.

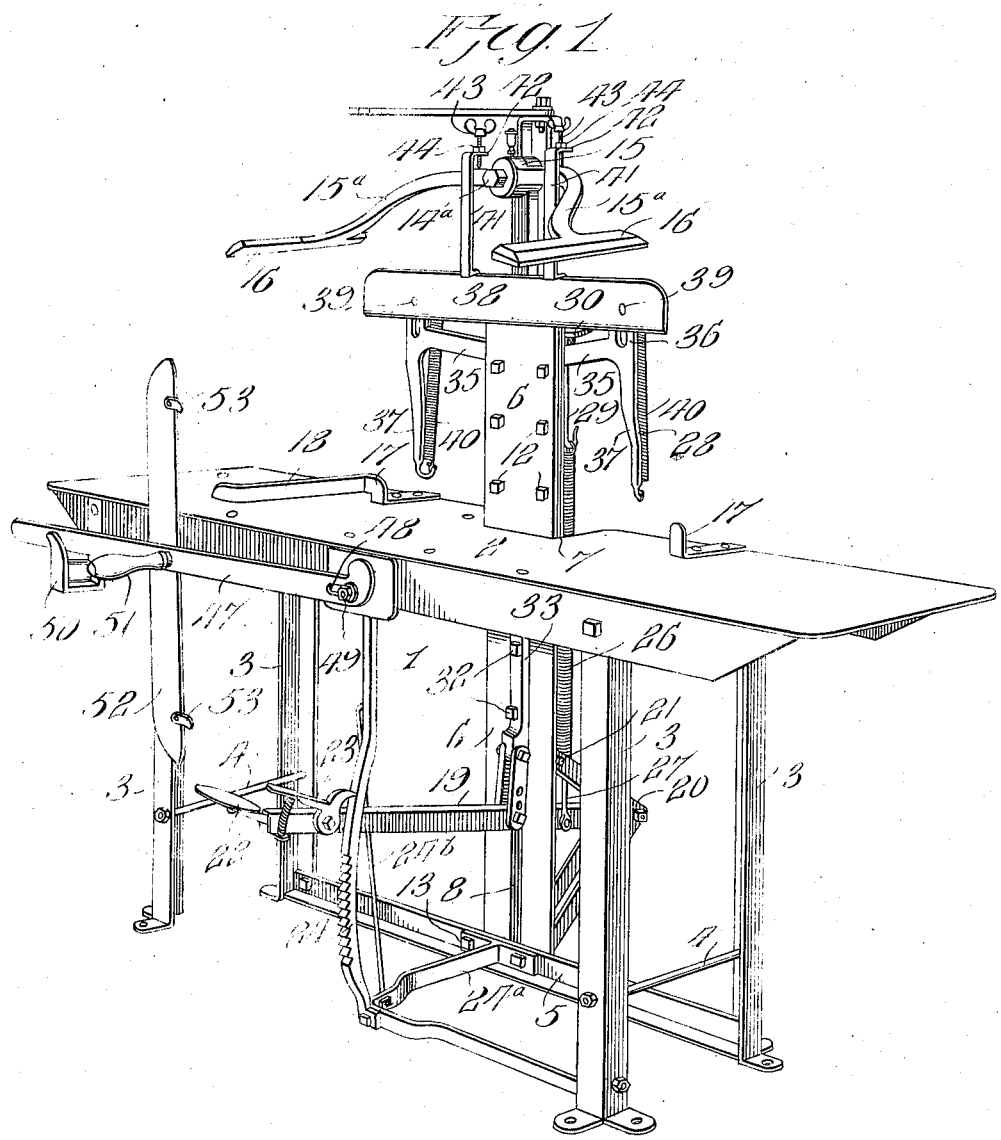

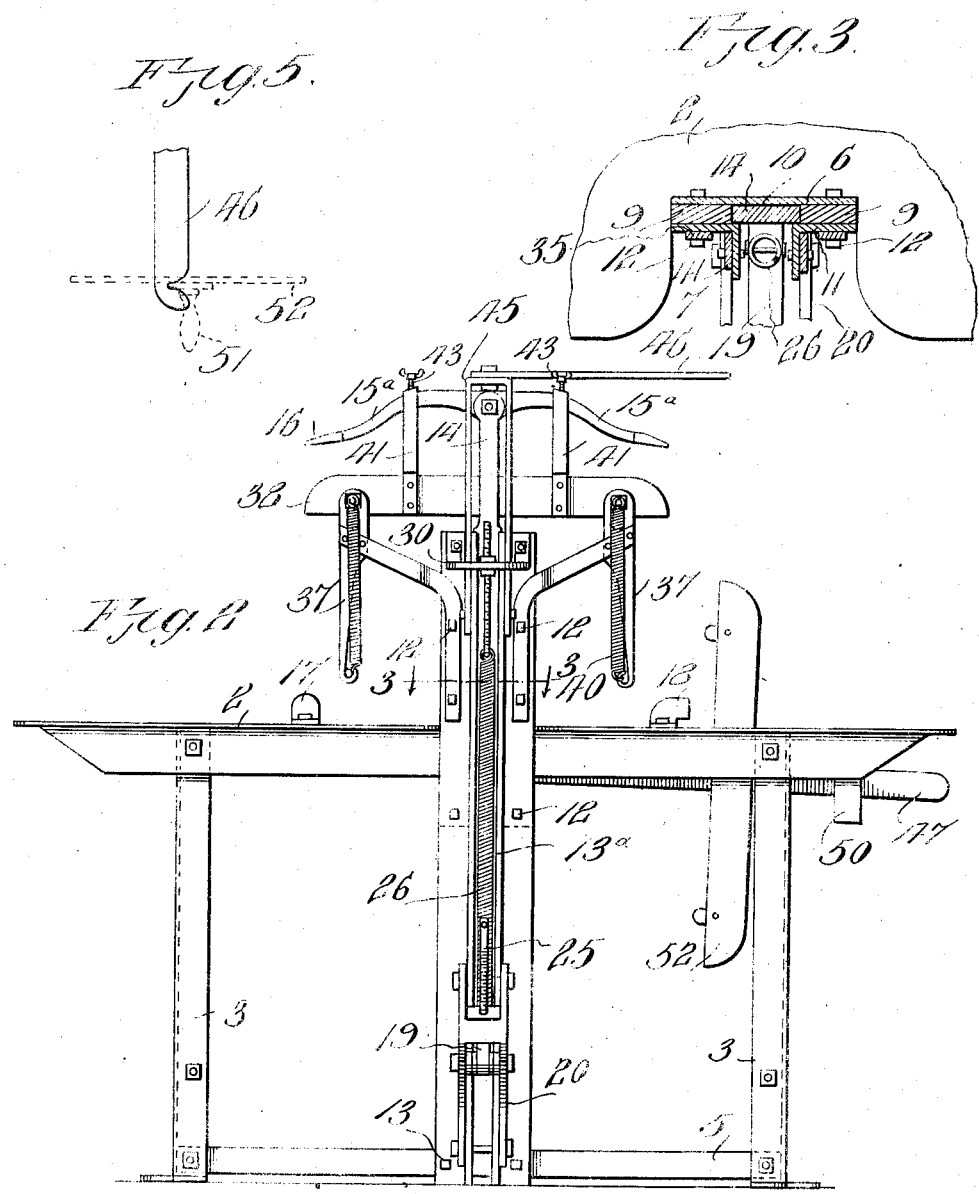

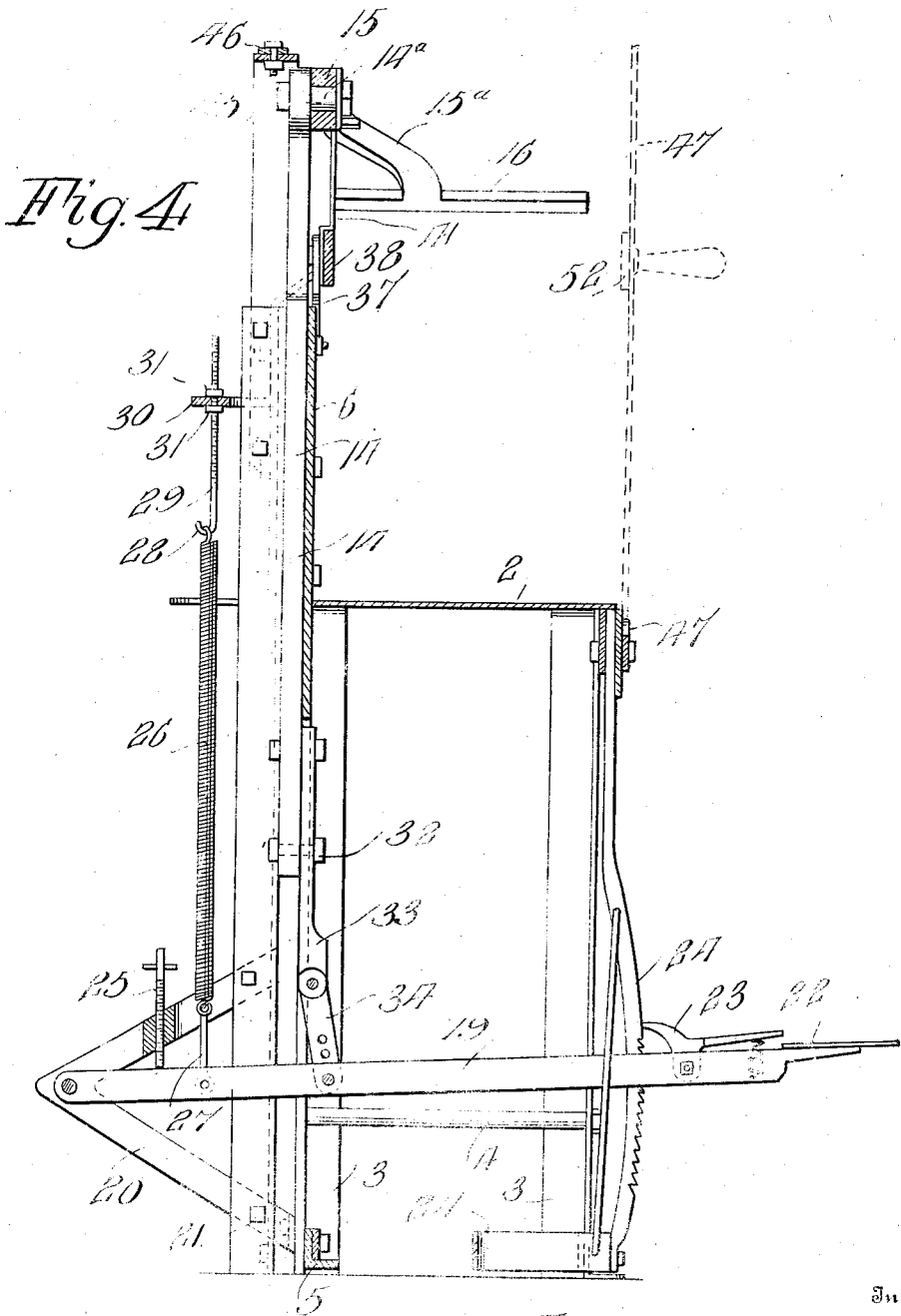

FRANK R. COVEY, OF RIVERSIDE, CALIFORNIA.

BOX-LID CLAMP OR HOLDER.

965,087.   Specification of Letters Patent.   Patented July 19, 1910.

Application filed January 5, 1910. Serial No. 536,503.

*To all whom it may concern:*

Be it known that I, FRANK R. COVEY, a citizen of the United States, residing at Riverside, in the county of Riverside and State of California, have invented new and useful Improvements in Box-Lid Clamps or Holders, of which the following is a specification.

This invention relates to an apparatus for clamping or holding the lids or covers of fruit or other boxes while such lids or covers are being nailed.

One of the objects of the invention is to provide a simple and effective construction of apparatus which may be conveniently operated by a single operator or pressman, and in which the presser head of the clamping mechanism is self-adjusting to accommodate itself to irregularities in the height and shape of boxes and is adapted also to apply an equal pressure to the portions of the lid or cover against which it bears.

Another object of the invention is to provide simple and effective means for regulating the degree of self-adjusting action or movement of the presser head and for yieldingly controlling such action.

Still another object of the invention is to provide a "high pack" attachment for use particularly in fruit packing where the fruit is packed above the surface of the box and is forced into the same by the lid or cover when the latter is applied, said attachment serving to guide the fruit down into the box as well as to guide the cover in its downward movement, thus preventing the fruit from being caught by and crushed against the edges of the side walls of the box.

Still another object of the invention is to provide a novel construction of means for operating the parts, permitting automatic adjustment of the presser head and an associated portion of the "high pack" attachment, and for returning the parts after operation to normal position, and to generally improve the construction and increase the practical efficiency of apparatus of this character and produce an apparatus which is not liable to get out of order and is susceptible of manufacture at a comparatively low cost.

With these and other objects in view, the invention consists of the features of construction, combination and arrangement of parts hereinafter fully described and claimed, reference being had to the accompanying drawings, in which:—

Figure 1 is a perspective view of a lid clamping apparatus embodying my invention with parts as normally arranged for use. Fig. 2 is a rear elevation of the same. Fig. 3 is a horizontal section on line 3—3 of Fig. 2. Fig. 4 is a vertical central front to rear section, showing in dotted lines the front guide and the locking arm of the "high pack" attachment as arranged for use. Fig. 5 is a detail of the front guide and its locking arm.

Referring now more particularly to the drawings, 1 represents the frame of the apparatus, comprising a horizontal rectangular bed or table 2 preferably formed of sheet metal, such as sheet steel, and mounted at or adjacent its corner portions upon angle-metal supporting legs 3 suitably constructed for attachment at their lower ends to a floor or other foundation. The front and rear legs at each end of the table are coupled and braced by tie-bolts 4 and the lower ends of the rear legs are connected and braced by an angle-metal cross-bar 5.

Fastened in any secure manner to the frame structure is a standard 6, preferably consisting of a metallic plate extending upwardly from the bar 5 to a suitable point above the top of the table through a central recess 7 in the rear edge of the table, and provided in its lower portion with a vertical guide slot 8. Secured to the rear face of the upper portion of the standard and extending any suitable distance downward from the top thereof are spaced guide bars 9 forming a vertical guideway 10, and arranged in rear of said bars and extending the full length of the standard are angle-metal strips 11 of L-form, said strips being secured at their upper ends with the bars 9 to the standard by bolts 12 and at their lower ends to the standard by bolts 13, the rearwardly extending webs of said strips forming a guideway 13ª and supports for certain parts of the apparatus, as hereinafter described, while the strips as a whole serve to reinforce and strengthen the standard.

Fitted for vertical movement in the guideway 10 is a plunger rod or bar 14 carrying at its upper end a bolt or stud 14ª on which is pivotally mounted a presser head embodying a central hub 15 carrying a pair of forwardly and laterally curved arms 15ª extending in opposite directions toward the front and opposite ends of the table. The forward or free ends of these arms lie above the longitudinal center of the table and on opposite sides of the transverse center thereof and are provided with transverse clamping plates 16 to bear upon the lid or cover of the box. The clamping members thus formed are T-shaped, and by reason of the pivotal movement of the head, which is properly limited as hereinafter described, the head is rendered self-adjusting to accommodate itself to irregularities in the height and shapes of boxes and to bear with equal pressure upon the engaged surfaces of the lid. The box rests upon the table 2 with its rear side resting against gage pieces or stops 17, one of which is provided with a forwardly projecting arm 18 to bear against one of the ends of the box, whereby the box may be properly applied in position beneath the presser head.

A foot-lever 19 extends from the front of the machine below the table through the slot 8 and lower portion of the guideway 13ª, in which it is vertically movable, to a point in rear of the machine, where it is pivoted at its rear end to and between the portions of a duplex V-shaped bracket 20 secured to the strips 11 by bolts 21 and to the bar or strip 5 by the bolts 13. The forward end of this lever carries a tread plate 22 and a spring-actuated dog 23 adapted to engage the teeth of a rack bar 24 to lock the lever in adjusted position. As shown, the rack bar is secured at its upper end to the table and at its lower end to a bracket 24ª fixed to the base of the frame, and a rod 24ᵇ secured to the rack bar and bracket coacts with the bar to form a guide for the forward end of the lever. The bracket 20 carries an adjustable stop 25 to limit the upward movement of the lever under the action of a coiled contractile spring 26 connected at its lower end to the lever by a coupling link 27 and at its upper end to the hooked lower end 28 of an adjustable rod 29 threaded to engage a threaded opening in a bracket plate 30 and adapted to be fixed in adjusted position by nuts 31, said bracket being fastened upon the upper rear portion of the standard by certain of the bolts 12. Secured to the lower end of the plunger bar, as by bolts 32, is a bracket 33 slidable vertically in the slot 8 and adjustably connected to the lever by links 34, so that upon depressing the lever the plunger bar and presser head will be drawn downward to clamp the lid in position upon the box, in which position it may be held while it is being nailed by engaging the dog with the rack. Upon releasing the dog the spring 26, which is expanded upon the depression of the lever, restores the parts to normal position.

Brackets 35 are fastened to the standard by certain of the bolts 12 and project laterally from opposite sides thereof, and each of these brackets is formed with an upwardly extending vertically slotted arm 36 and a depending arm 37 hooked at its lower end. These brackets support a vertically movable guide plate or member 38 carrying pins or bolts 39 movable in the slotted arms, and to the rear ends of these bolts are attached the upper ends of coiled springs 40, connected at their lower ends with the hooked portions of the arms 37. Uprights 41 rise from the upper edge of the guide plate and are bent at their upper end to form extensions 42 overhanging the arms of the presser head and threaded to receive stop screws 43 bearing on said arms and retained in adjusted position by lock nuts 44. This guide plate forms a part of the "high pack" attachment and is movable with the presser head, the purpose of the plate being to bear against the rear side of the box and extend above the upper edge of the same and engage and form a guide for the rear side edge of the lid or cover while the latter is being forced down by the presser head to pack the fruit within the box and brought in position to be nailed. This guiding action prevents any tendency to rearward displacement of the cover, and the plate also closes the space between the adjacent side of the box and the cover and prevents the fruit from being forced outward and crushed or bruised between the edge of the side and the cover. It will be understood that through the slidable connection of the guide plate with the brackets and engagement of the screws 43 with the presser head on opposite sides of the pivotal support of the latter the springs 40, which are expanded or placed under tension by the downward adjustment of the screws, act to yieldingly hold said presser head from pivotal movement. The spring 26 is of greater strength than the combined strength of the springs 40, so that upon the upward movement of the plunger bar to normal position in the retraction of the presser head the guide plate will be elevated and the springs 40 placed under more or less tension according to the adjustment of the screws 43 to regulate their resistance to the pivotal movement of the presser head. When, however, the presser head is drawn downward and its arms are brought into engagement with the lid or cover pivotal movement of said head is permitted through the yielding action of the springs 40, which draw the guide plate downward and maintain the screws 43 in engagement with said arms, and hence the head is allowed sufficient yielding movement to set straight or at an angle so that its arms will accommodate themselves to variations in the levels of the portions of the lid engaged thereby, due to irregularities in packing or irregularities in the height or shapes of the boxes. A yoke 45 is secured to and extends above the upper end of the standard, and to the crown of this yoke is pivoted at one end a locking bar 46, whose free end is notched to form a catch or hook to engage the front section of the "high pack" attachment, which will now be described.

A lever 47 is provided at one end with a slot 48 pivotally connected to the front of the table by a bolt 49 so that it may be swung from a horizontal to a vertical position, or vice versa. The free end of this lever is adapted to rest when said lever is horizontal upon a supporting bracket 50, and to said lever is attached a handle 51 whereby it may be manually adjusted. Disposed at right angles to the lever and intermediately fixed to the center thereof is a guide plate 52 similar in form and dimensions to the plate 38 and adapted to lie, when the lever is upright, in alinement with said plate 38 and to bear against the outer side of the box and outer side edge of the cover, so that the two plates will guide the cover in a true path while it is being forced down by the presser head. The plate 52 is adapted to rest at its lower edge upon the lid and is provided with guiding and retaining fingers 53.

In packing fruits of certain kinds in boxes for shipment the fruit is packed or piled high above the top of the box and is forced down into the same by the lid under the action of the presser head, so that the fruit will be snugly and evenly packed in the box. The pressure of the lid on the superposed portion of the fruit tends to force the fruit outward toward the sides of the box, commonly resulting in the escape of the fruit or the crushing of the same against the upper edges of the sides of the box. Consequently difficulty is experienced in packing fruits in this way and much time consumed in the operation. The purpose of my "high packing" attachment, which is an important part of my invention, is to obviate these objections and to provide a means by which the cover will be guided and the fruit retained in position so that it cannot escape or become crushed or bruised, and whereby, therefore, the operation of compressing the fruit and applying the lid may be accomplished at the expenditure of much less time and trouble.

In applying the cover to a box packed in the ordinary manner, it will be understood that the box is placed in position upon the table and the cover applied and clamped in place by depressing the lever to bring the presser head to bear upon the cover, the lever being locked by engagement of the pawl with the rack so that both hands of the operator will be free to nail the cover. In the operation of applying the cover to a high-packed box, the cover is rested upon the top of the fruit and the lever 47 swung to a vertical position and moved upward to the limit afforded by the slot 48 to bring the plate 47 to a position above the top of the lid, after which the guiding device is allowed to drop down slightly through its sliding engagement with bolt 49 so that the plate 47 will rest upon the lid, the fingers 57 engaging the adjacent edge of the lid and guiding the same in such downward movement and assisting in retaining the device in position. The front guiding device will thereupon be supported by the box with the plate 52 in position to guide the adjacent side edge of the cover in its downward movement and to cover the space between the same and the top of the box to prevent outward displacement of the fruit, while the rear guide plate 38 will perform a corresponding function at the rear side of the box. Hence when the presser head is drawn down by the lever mechanism the lid will be forced down upon the top of the box and guided in a true path, and the fruit will be closely packed into the box without any liability of the same escaping or becoming crushed or bruised against the sides of the box. After the lid has been forced tight against the top of the box, it may be clamped in such position by locking the lever mechanism against movement, leaving both hands of the operator free to drive the nails. Upon release of the locking device, the presser head will be returned to normal position for the succeeding operation, as previously explained. The guide plate 38 does not interfere with the use of the presser head in applying the lids in ordinary packing, and when under such conditions its use is not desired the front guide may be turned down to its normal horizontal position out of the way of the operator, as shown in Fig. 1. From the foregoing description, the advantages of the apparatus will, therefore, be thoroughly understood and appreciated.

Having thus fully described the invention, what is claimed as new is:—

1. In an apparatus of the character described, the combination of a box support, a pivotally mounted lid clamp having bearing portions on opposite sides of its pivotal support, means for moving said clamp toward and from the supported box to engage and release the lid, and means for yieldingly holding said clamp against pivotal movement.

2. In an apparatus of the character described, the combination of a box support, an intermediately pivoted lid clamp provided with bearing arms extending in opposite directions from its pivoted portion, means for moving said clamp toward and from the supported box to engage and release the lid, and means acting upon said bearing arms to yieldingly hold the clamp against pivotal movement.

3. In an apparatus of the character described, the combination of a box support, a lid clamp movable toward and from said support, said clamp being intermediately pivoted and provided with oppositely extending T-shaped bearing arms, means for operating said clamp, and means acting upon the arms to yieldingly hold the clamp against pivotal movement.

4. In an apparatus of the character described, the combination, with box supporting means, of a lid clamp pivotally mounted and provided with oppositely disposed bearing portions, and means acting upon said bearing portions to oppose a yielding resistance to the pivotal movement of the clamp.

5. In an apparatus of the character described, the combination of a bed or table, a lid clamp movable toward and from the same, said clamp being mounted for pivotal movement and provided with oppositely extending bearing portions, means for operating the clamp, pressure devices engaging the bearing portions of the clamp to yieldingly hold the same from pivotal movement, and means for regulating the pressure of said devices.

6. In an apparatus of the character described, the combination of a bed or table, a pivotally mounted lid clamp movable toward and from the same, said clamp being provided with oppositely extending bearing portions, means for operating the clamp, pressure devices engaging the bearing portions of the clamp, and springs acting on said pressure devices to adapt the latter to oppose a yielding resistance to the pivotal movement of the clamp.

7. In an apparatus of the character described, the combination of a bed or table, a pivotally mounted lid clamp movable toward and from the same, said clamp being provided with oppositely extending bearing portions, means for operating the clamp, resistance springs, brackets controlled by said springs, and adjustable pressure devices carried by the brackets and engaging said bearing portions of the clamp to oppose a yielding resistance through the action of the springs to the pivotal movement of the clamp.

8. In an apparatus of the character described, the combination of a bed or table, a pivotally mounted lid clamp movable toward and from the same, means for operating the clamp, a vertically adjustable guide member, springs opposing resistance to the upward movement of said member, and pressure devices carried by said member and engaging the bearing portions of the clamp to oppose a yielding resistance to the pivotal movement of the clamp.

9. In an apparatus of the character described, the combination of a bed or table, a lid clamp movable toward and from the same and provided with oppositely projecting bearing portions, said clamp being pivotally mounted, means for moving the clamp toward and from the table, said means including a spring for retracting the clamp, a vertically movable lid guide, springs acting on said guide to oppose a resistance to the upward movement thereof, arms carried by the guide, and adjustable pressure devices carried by said arms and acting upon the bearing portions of the clamp to yieldingly oppose through said springs a resistance to the pivotal movement of the clamp.

10. In an apparatus of the character described, the combination of a bed or table, a vertically movable plunger bar, a lid clamp pivotally mounted upon said bar, means for depressing the bar to bring the clamp into engagement with the lid, a spring for retracting the bar, and spring means for establishing opposing resistance to the pivotal movements of the clamp.

11. In an apparatus of the character described, the combination of a bed or table, a lid clamping device, means for operating the same, a lid guide at the rear of the table, and a manually adjustable lid guide at the front of the table.

12. In an apparatus of the character described, the combination of a bed or table, a vertically movable lid clamp, a rear lid guide adjustable with said clamp, and a manually adjustable front lid guide adapted for coöperation with said rear lid guide.

13. In an apparatus of the character described, the combination of a bed or table, a vertically movable lid clamp, a vertically adjustable rear lid guide movable with the clamp, and a front lid guide adapted to be manually adjusted to a position to coöperate with said rear lid guide.

14. In an apparatus of the character described, the combination of a bed or table, lid clamping means, a rear guiding device for the lid, and a coöperating front guiding device for the lid, the latter being normally inoperative and adapted to be manually adjusted to an operative position.

15. In an apparatus of the character described, the combination of a bed or table, lid clamping means, a rear guiding device for the lid adapted to cover the space between the lid and the adjacent side of the box, and a front guiding device for the lid adapted to cover the space between the same and the front side of the box, said front guiding device being adapted for movement into and out of operative position.

16. In an apparatus of the character described, the combination of a bed or table, a vertically movable lid clamping device, means for depressing the same, a spring for returning said device to normal position, a rear lid guide, said guide being vertically movable, spring means for normally depressing the same, means carried by said guide to oppose a yielding resistance through said spring to the pivotal movement of the clamp, a front guide adapted to be moved from an inoperative to an operative position, and means for holding said guide in its operative position.

17. In an apparatus of the character described, the combination with a support for the box, a lid clamping means, and means for operating the same, of means for guiding the lid as it is being forced down upon the box and simultaneously holding the excess portion of the material to be packed from displacement.

18. In an apparatus of the character described, the combination with a support for the box, a vertically movable lid clamping device, and means for operating the same, of a rear guide for the lid adapted to cover the space between the same and the adjacent side of the box, a front guide for the lid adapted to cover the space between the same and the front side of the box, said front side being mounted for adjustment from an inoperative to an operative position, and means for retaining said front guide in its operative position.

19. In an apparatus of the character described, the combination of a box support, a vertically movable lid clamping device, means for operating the same, a rear lid guide, a pivotally mounted front lid guide adapted to be swung up to a position to coöperate with the rear lid guide, and a holding device for retaining said front lid guide in operative position.

20. In an apparatus of the character described, the combination of a box support, lid clamping means, a rear lid guiding device, a pivotally mounted lever adapted to be swung from a normally horizontal position to a vertical position and vertically adjusted in the latter-named position, and a front lid guide carried by said lever and adapted when the latter is swung up to be arranged for coöperation with said rear lid guide.

In testimony whereof I affix my signature in presence of two witnesses.

FRANK R. COVEY.

Witnesses:
M. B. MARTER,
A. E. W. MCDONALD.